Dec. 27, 1966    M. C. SICARD ETAL    3,294,241
EASILY ASSEMBLED FILTER ASSEMBLY
Filed Dec. 11, 1963    3 Sheets-Sheet 1

INVENTORS
ARTHUR W. SCHNICK
MARCEL CLARENCE SICARD
BY
ATTORNEY

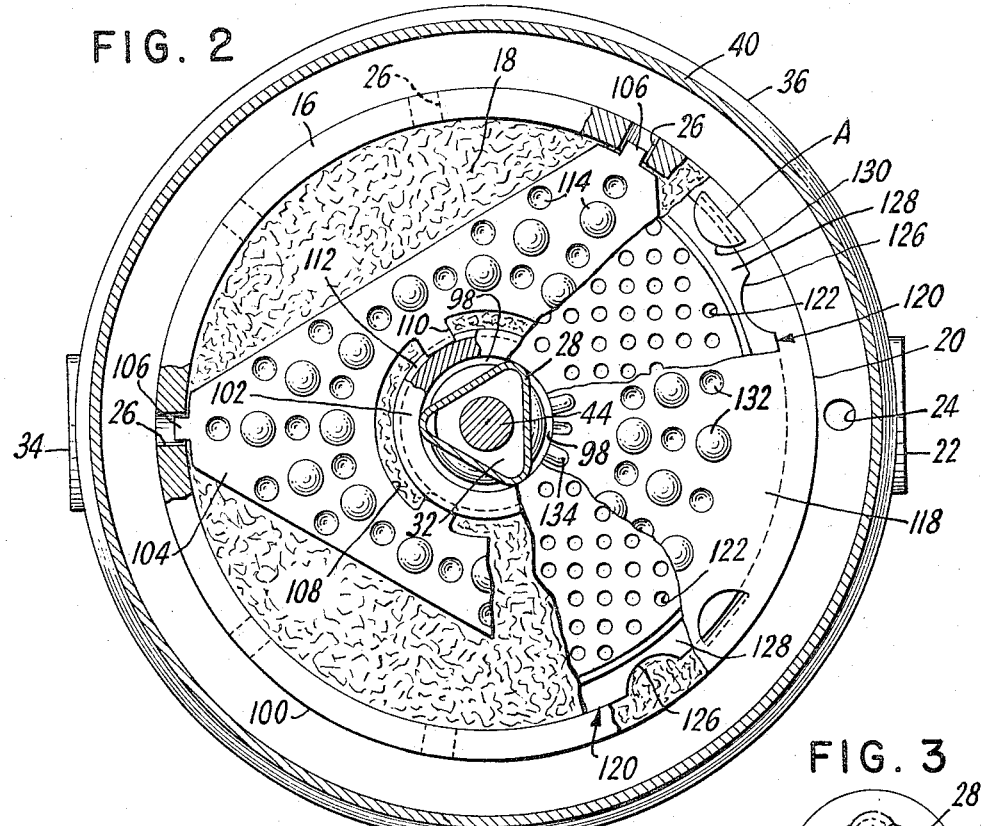

Dec. 27, 1966 M. C. SICARD ETAL 3,294,241
EASILY ASSEMBLED FILTER ASSEMBLY
Filed Dec. 11, 1963 3 Sheets-Sheet 3

INVENTORS
ARTHUR W. SCHNICK
MARCEL CLARENCE SICARD
BY
ATTORNEY

United States Patent Office 3,294,241
Patented Dec. 27, 1966

3,294,241
EASILY ASSEMBLED FILTER ASSEMBLY
Marcel Clarence Sicard, Cheshire, and Arthur W. Schnick, Meriden, Conn., assignors to American Machine & Foundry Company, a corporation of New Jersey
Filed Dec. 11, 1963, Ser. No. 329,621
10 Claims. (Cl. 210—232)

This invention relates to the art of fluid filtration, and, in particular, to the construction of the housings and other parts of filters employing sheets or discs of porous media such as paper, asbestos, cellulose, etc., arranged in a plurality of units stacked within a housing.

Filters of the subject type are commonly used in batch, rather than continuous flow operations and the filter media usually has a relatively short life. It must, for obvious commercial reasons, be easily replaced with a minimum of attention and, most frequently, by unskilled help.

One of the serious objections to prior art construction lies in the difficulty of preventing contamination of the "clean" side of the filter during replacement of the media. Another objection lies in the difficulty of removing fragments of media, asbestos fibers for example, which by one means or another have become lodged in the drainage cells or discs used in constructing the filter stack. In general, the prior art devices require an undue amount of attention and skill during normal maintenance operations.

One object of the invention is to provide a filter wherein accidental contamination of the clean side is substantially prevented.

Another object is to afford a construction wherein the permanent components are readily cleaned.

A further object is to provide a filter of the type in case where the filter element and its drainage duct may be changed as a unit.

Figure 1:
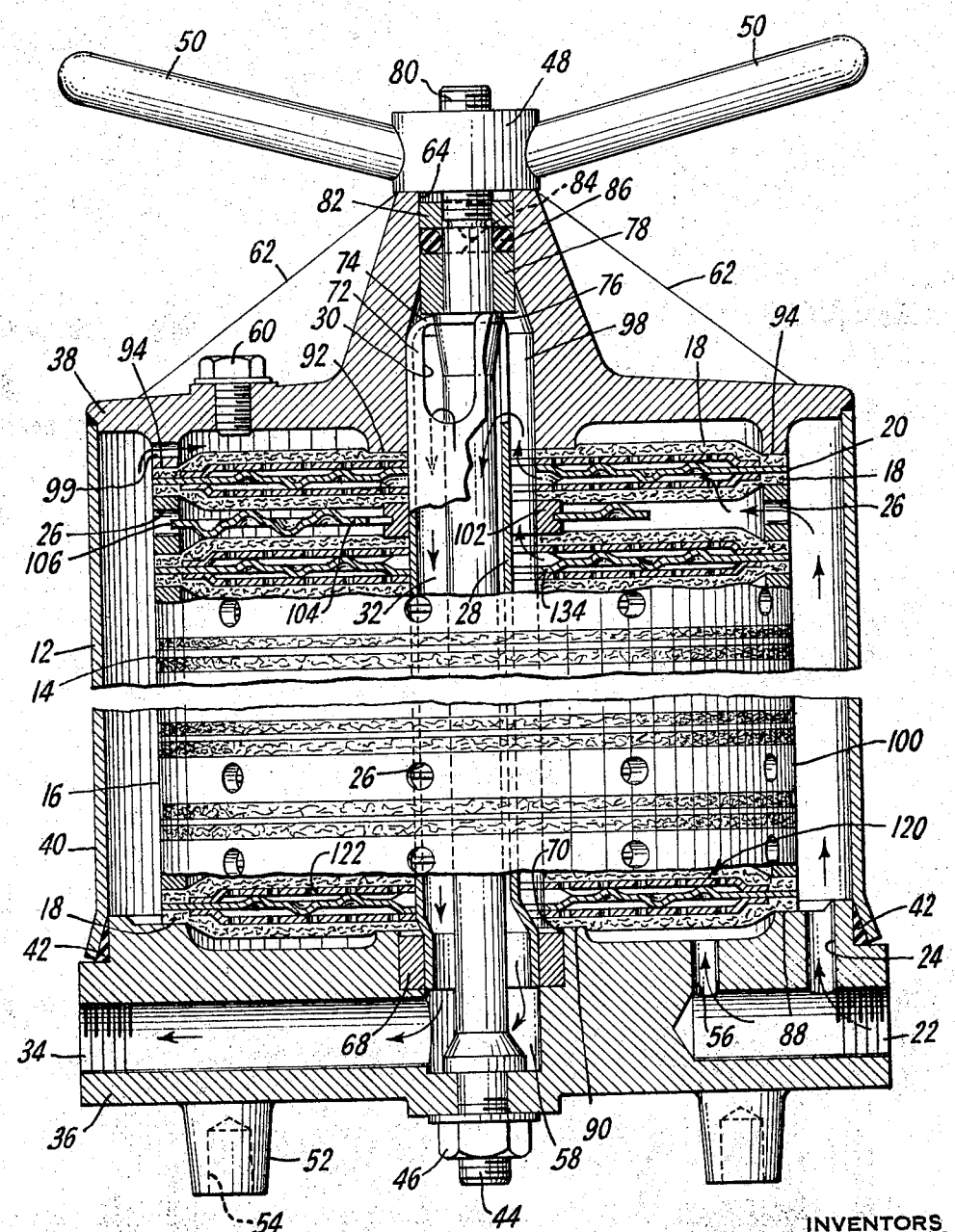
Figure 9:
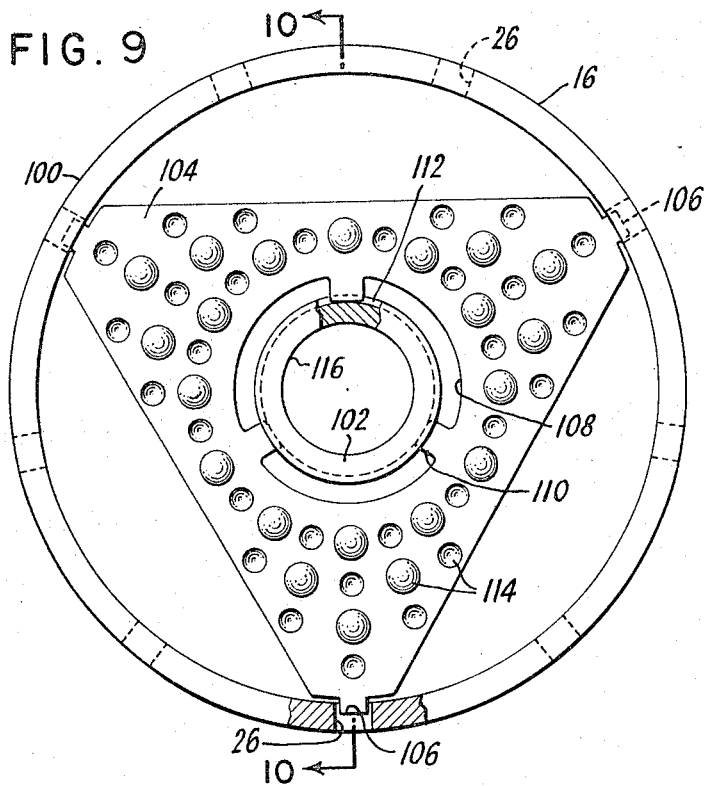
Figure 10:
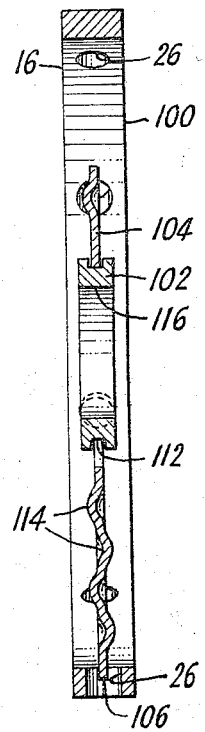
Figure 7:
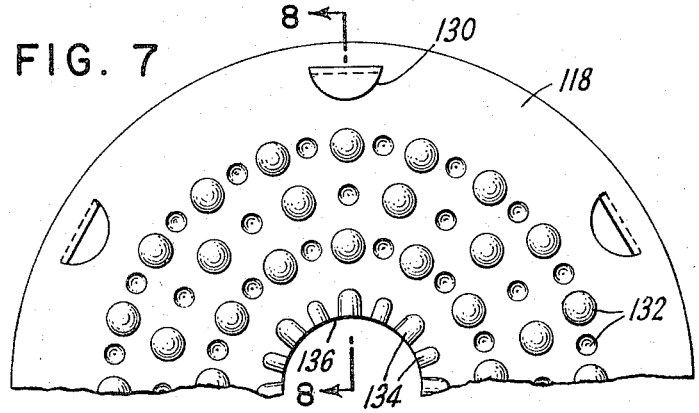
Figure 8:
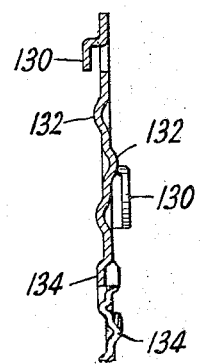
Figure 11:
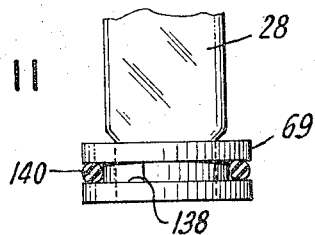

These and other objects will be readily apparent from the following description and the accompanying drawings in which:

FIG. 1 is a view of a filter, sectioned vertically on the center line;
FIG. 2 is a section on the line 2—2 of FIG. 1;
FIG. 3 is a plan view of the collector tube;
FIG. 4 is an elevation of the tube of FIG. 3;
FIG. 5 is a fragmentary plan view of a filter media support plate;
FIG. 6 is a cross sectional view taken along line 6—6 of FIG. 5;
FIG. 7 is a fragmentary view of a carrier disc used to reinforce and carry the support plates;
FIG. 8 is a cross sectional view taken along line 8—8 of FIG. 7;
FIG. 9 is a plan view of an inlet spacer;
FIG. 10 is a cross sectional view of the spacer of FIG. 9 on the line 10—10;
FIG. 11 shows a simple modification of the collector tube of FIGS. 3 and 4.

The filter herein disclosed is a preferred embodiment of the invention. As shown in FIG. 1, it has a pressure tight housing 12, enclosing a filter stack 14, comprising inlet spacers 16, filter discs 18, and drainage cells 20. Fluid to be filtered enters inlet port 22, passes through opening 24 to the interior of housing 12, whence it flows via openings 26 in the inlet spacers 16, through the filter discs 18 (where it is filtered) and thence through perforate sheet metal walls to the interior of the drainage cells 20. From these cells the fluid moves upward, via passages 98, as shown by flow indicating arrows, on the outside of the non-circular collector tube 28, through notches 30 adjacent the top thereof and then into its interior 32 and out via central cavity 58 and outlet port 34.

The filter housing 12 is substantially cylindrical and comprises a base 36, a cover 38, and a shell 40. A gasket 42 seats the joint between base 36 and shell 40 while the joint between the latter and cover 38 is preferably welded, thereby forming a bell-jar like housing. These parts are held together by a center bolt or stud 44, which is secured to the base 36 by nut 46 and at the top has another nut 48 having arms 50 for convenience in handling. The base 36 has number of legs 52 which may be drilled and tapped as at 54 for hold-down screws. The inlet port 22 has a second opening, 56, for fluid access to the nethermost of the filter discs 18. The cover 38 has a vent screw 60 and a plurality of strengthening ribs 62 and is centrally apertured at 64 for cooperation with central bolt 44 and its associated parts. The construction of the housing 12, as described, is substantially conventional and needs no further elaboration.

The collector tube 28, of non-circular cross-section, in the present case triangular with rounded corners, is formed to a circular cross-section at one end and secured, with a tight joint, in bushing 68 which has a substantially fluid proof fit in the bore 70, of base 36. As shown in FIGS. 1, 3 and 4, the tube 28, at the end remote from bushing 68, has a series of notches 30 which define a plurality of fingers 72 having inwardly turned tips 74 shaped for engagement with the enlarged diameter portion 76 of bolt or stud 44 and with the underside of bushing 78 which is a snug slip fit on bolt 44 and rests on the shoulder formed by portion 76 while engaging the wall of aperture 64 to centralize the cover 38 relative to the bolt 44.

As also shown in FIG. 1, the thread 80 terminates above bushing 78, and on it is screwed, as far as it will go, a collar 82, which has also a close, centralizing slip fit in aperture 64, thus affording a groove 84 in which is placed an O ring gasket 86, serving to seal between bolt 44, collar 82 and the wall of aperture 64. This arrangement greatly facilitates the installation of the O ring gasket 86 as it need not be stretched over a shoulder as is required in conventional usage, and which frequently results in damage to the sealing ability of the O ring.

Each member of filter stack 14 has a substantially circular central hole which is an easy slip fit on the land-like rounded corners of collector tube 28. The base 36 and the cover 38 have opposingly facing pairs of concentric lands 88–90, and 92–94, respectively, and the filter stack 14 is compressed between these pairs of lands by axially directed force applied by the nut 48 to cover 38. The compression so imposed affects gasket-like engagement of the inner and outer edges of the filter discs 18 and the juxtaposed surfaces of the aforementioned lands 88–90 and 92–94 and of the inlet spacers 16 and drainage cells 20. A drilling 99 affords fluid access to the upper-most of the filter discs 18. The organization of parts assures that all fluid passing through the filter must go through the filter discs 18 and additionally it provides a plurality of passages 98 (see FIG. 2) along which filtered fluid flows.

The inlet spacers 16 are shown in detail in FIGS. 9 and 10. They comprise a rim 100, a hub 102 and a web 104, which is of springy material and has tabs 106 which may be snapped into some of the holes 26 in rim 100 while its central opening 108 is shaped to afford other tabs 10 suited to be sprung into and loosely engage a groove 112 formed in the periphery of the hub 102 which also has a central hole 116. The web 104 is also formed to provide a number of projections or bosses 114 which protrude axially in either direction and hold the filter discs 18 against the support plates 120. The inlet spacers 16, so made, need no rivets or other fastening devices for their assembly and are very easily dismantled, without the use of tools, for complete cleaning or sterilizing when needed. As indicated earlier, the center hole 116 is an easy slip fit on collector tube 28 for the purpose described.

The drainage cells, generally indicated as 20, comprise a carrier disc 118 shown in FIGS. 7 and 8, and a pair of support plates 120 shown in FIGS. 5 and 6. The support plate 120 is preferably made of perforated sheet metal having holes 122 and formed into a shallow flanged cup having a plane bottom 123, a central hole 124 and at least one notch 126 in the flange 128 which, when the cells are assembled, rests on the carrier disc 118. The function of the inner disc 118 is to carry the support plates 120, to reinforce them against collapse under differential pressure imposed by the flow of fluid through the filter discs 18 and to afford space for the flow of fluid to the passages 98. A plurality of lugs 130, preferably six, are stamped near the edge of the disc and face alternately in either direction so as to provide locating and holding means for the support plates 120 whose rims are engaged as at A in FIG. 2, for which purpose the notch 126 permits entrance of the rim 128 between the lugs and the body of the disc and can be locked in place by slight rotation of support plate 120 relative to carrier disc 118. A series of projections or bosses 132 is formed in the disc and face in either direction as does a series of corrugations 134 formed around the periphery of the central hole 136; these bosses and corrugations afford the above mentioned reinforcement. Drainage cells, so constructed, are easily handled as assembled units and may be readily separated into their component parts for cleaning and sterilization without the use of tools or fastening means. It may here be noted that the thickness of a drainage cell 120 at its center, plus the thickness (axially) of an inlet spacer hub 102, must be equal to the thickness of the drainage cell at its periphery (i.e., the thickness of the sheet metal of disc 118) plus the thickness (axially) of an inlet spacer rim 100 in order to maintain uniform compression of the inner and outer peripheries of the filter discs 18.

The filter discs 18 are made in simple washer form, of any convenient and suitable material such as paper, cloth, felt, wire mesh, asbestos or a mixture of asbestos and cellulose, etc., are so old in the art as to need no further description.

In FIG. 11 is shown a modification of the construction of collector tube 28. Here the bushing 69 is made an easy slip fit in bore 70 and is provided with a groove 138 carrying O ring 140 which is suited for sealing engagement with the bushing 69 and bore 70. By this means it is a simple matter to remove the whole filtering stack and replace it with another, leaving the cleaning of parts and filter disc replacement, to be done later. The fact that the diameter of bushing 69 is greater than the inside diameter of the filter stack components makes this practical without the use of extra parts; these relative diameters are clearly shown in FIG. 1.

When the filter media need replacement, nut 48 is unscrewed and cover 38 together with the attached shell 40 is lifted off. The filter stack may then be removed. In the prior art structures, the collector tube is usually a cylinder of perforate metal and there is a serious danger that with the release of axial compression on the stack 14, the dirty fluid and sludge remaining therein may flow through the perforations and into the clean side of the filter housing. There is also danger that the edges of the dirty filter discs may be abraded thereon so that objectionable matter is deposited on the clean side of the filter. However, in the present structure there is no danger as the collector tube is smooth and imperforate and fluid will not flow upward, against gravity, into the notches 30, nor will the smooth walls of the tube 28 abrade the filter discs. Further, should any dirt fall on to the base 36, during manipulation of the filter stack 14, it will have no access to the clean side. Should the alternate structure of FIG. 11 be utilized, there is still little chance of dirt entering the clean side as all contaminants, together with the center tube are removed en-mass.

It will thus be seen that the objects set forth above, and those made apparent from the preceding description, are efficiently attained. As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A filter comprising a pressure tight housing, having lower and upper facing end members, a substantially cylindrical hollow filter stack held under endwise compression within said housing by and between said end members, said lower end member having inlet and outlet passages and a central cavity communcating with said outlet passage, said upper end member having a central cavity communcating with the center of said stack, a non-circular impermeable collector tube supported in said lower central cavity in fluid tight engagement therewith and passing axially through said stack beyond the upper surface thereof into said upper cavity, said collector tube having at least one opening adjacent its upper end and axially beyond said upper surface and radially extreme and axially extending land-like surfaces engaging the interior peripheral walls of said stack and said upper cavity to affect trans-axial alignment therebetween and to define, in conjunction with said peripheral walls, a plurality of axially extending passages stretching from said lower member to said central cavity within said upper member and communicating with the interior of said tube, and means for maintaining said housing, said stack and said tube in pressure tight condition with respect to each other, whereby fluid entering said filter serially passes through said stack, vertically upward through said axially extending passages, thence downwardly through said collectar tube and outward from said outlet port.

2. The filter in accordance with claim 1 including a collar bushing carried on the lower end of said collector tube, said bushing being engageable by the bottom of the filter stack so as to permit removal of said stack simultaneously with the removal of said collector tube from the lower central cavity.

3. The filter in accordance with claim 2 wherein the said bushing is provided with elastomeric sealing means for sealing the engagement of the collector tube and the lower central cavity.

4. A filter comprising a pressure tight housing, having lower and upper end members, a substantially cylindrical hollow filter stack held under endwise compression within said housing by and between said end members, said lower end member having an inlet and outlet passage and a central cavity communicating with said outlet passage, said upper member having a central bore communicating with the center of said stack, a non-circular impermeable collector tube supported in said cavity in fluid tight engagement and passing axially through said stack and there beyond into said bore, said tube having a plurality of inwardly deflected fingers at its upper end and further having radially extreme and axially extending land-like surfaces engaging the interior peripheral walls of said stack and of said bore to affect trans-axial alignment therebetween and defining, in conjunction with said peripheral walls, a plurality of axially extending passages stretching from said lower member to said bore within said upper member and communicating with the interior of said tube, and a stud member secured to said lower member and passing axially through said tube and said bore and having at its upper end a screw thread and a nut thereon wherewith said upper member may be urged toward said lower member to affect axial compression of said stack, said stud member further having a collar carried by said screw thread and sized for sliding engagement with said bore and presenting a downwardly facing shoulder serving to axially locate and retain an elastomeric ring sealingly engaging said stud member and said wall of said bore to maintain a pressure tight condition therebetween, said stud member being engaged by said inwardly deflected fingers of said tube to maintain said tube and said stud member in substantially coaxial relationship when free from the aligning influence of said bore and said collar.

5. A filter as in claim 4 wherein said collar may be removed from said stud member to permit placement or removal of said elastomeric ring without appreciable stretching thereof.

6. A unitary cell for a filter stack of the type described comprising a carrier disc having on each face a plurality of axially and radially inwardly extending lugs, a pair of shallow foraminous cup-like support plates each having a peripheral flange and arranged one on either side of said carrier disc with their concavity facing inwardly, said peripheral flange being smaller in diameter than the diametral dimension defined by the axial extending portion of said lugs and larger than the smallest diametral dimension defined by the radially inwardly extending portions of said lugs, said flange being further notched to afford initial engagement with said lugs whereby interlocking engagement of said support plates and said carrier is accomplished by relative rotation of said carrier disc and said support plates.

7. An inlet spacer for a filter stack of the type described comprising a pair of co-planar concentric rings each having undercut surfaces, a web supported in the annulus between said rings in interlocking engagement with said surfaces, said web being made of resilient material shaped and arranged to be sprung from its normal unrestrained form to permit resilient snap-in engagement with, and snap-out disengagement from said undercut surfaces without disabling distortion of either of said rings or said web.

8. An inlet spacer for a filter stack of the type described comprising a pair of co-planar concentric rings, the inner ring being formed with a groove on its radially outer surface, the outer ring being formed with a plurality of radial holes, a substantially flat web defining an annular form having engagement with and being supported between said rings by said groove and said holes, the engagement with said outer ring being occasioned by the protrusion of tongue-like projections into at least some of said holes and said engagement with said groove being performed by radially inwardly directed portions of the periphery of a non-circular aperture in said web wherein said inner ring is located and the whole being characterized by said web being resiliently deformable to permit snap-in engagement with and snap-out engagement from said rings.

9. A filter stack of the type described comprising in alternate layers a drainage cell formed of a carrier disc and a pair of support plates arranged one on either side of said carrier disc, a pair of micro-porous filter discs supported one on each of said support plates, and a spacer element interposed between successive layers, the whole being characterized by said drainage cell conforming to the structure claimed in claim 9 and said spacer element conforming to the structure claimed in claim 8.

10. The device of claim 9 wherein said axially and radially inwardly extending lugs which are comprised in said drainage cell are located wholly within a projection of the inner periphery of the outer ring of said spacer element.

References Cited by the Examiner

UNITED STATES PATENTS

| | | | |
|---|---|---|---|
| 612,105 | 10/1898 | Hendrick | 210—231 |
| 812,517 | 2/1906 | Paul | 210—343 |
| 2,278,453 | 4/1942 | Kracklauer | 210—344 X |
| 2,313,612 | 3/1943 | Alsop | 210—343 |
| 2,536,690 | 1/1951 | Miller | 210—344 |
| 2,770,370 | 11/1956 | Griffiths | 210—344 |
| 2,850,169 | 9/1958 | Briggs | 210—488 X |
| 2,886,180 | 5/1959 | Morgan et al. | 210—443 X |
| 3,083,834 | 4/1963 | Pall | 210—457 X |

REUBEN FRIEDMAN, *Primary Examiner.*

F. SPEAR, *Assistant Examiner.*